(12) United States Patent
Xin et al.

(10) Patent No.: US 11,057,302 B2
(45) Date of Patent: Jul. 6, 2021

(54) SENDING PACKET

(71) Applicant: NEW H3C TECHNOLOGIES CO., LTD., Zhejiang (CN)

(72) Inventors: Xubing Xin, Beijing (CN); Jiajia Liu, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 45 days.

(21) Appl. No.: 16/464,815

(22) PCT Filed: Nov. 29, 2017

(86) PCT No.: PCT/CN2017/113556
§ 371 (c)(1),
(2) Date: May 29, 2019

(87) PCT Pub. No.: WO2018/099394
PCT Pub. Date: Jun. 7, 2018

(65) Prior Publication Data
US 2019/0297013 A1    Sep. 26, 2019

(30) Foreign Application Priority Data

Nov. 30, 2016   (CN) .......................... 201611086150.4

(51) Int. Cl.
*H04L 12/741*   (2013.01)
*G06F 9/50*   (2006.01)
*H04L 12/935*   (2013.01)

(52) U.S. Cl.
CPC ............ *H04L 45/74* (2013.01); *G06F 9/5083* (2013.01); *H04L 49/3009* (2013.01)

(58) Field of Classification Search
None
See application file for complete search history.

(56) References Cited

U.S. PATENT DOCUMENTS 9,178,815 B2 * 11/2015 Gasparakis ............ H04L 69/324
10,142,231 B2 * 11/2018 Vasudevan .......... H04L 45/7453
(Continued)

FOREIGN PATENT DOCUMENTS

CN     101291290 A    10/2008
CN     102318275 A    1/2012
(Continued)

OTHER PUBLICATIONS

ISA State Intellectual Property Office of the People's Republic of China, International Search Report Issued in Application No. PCT/CN2017/113556, dated Feb. 7, 2018, WIPO, 4 pages.
(Continued)

*Primary Examiner* — Edan Orgad
*Assistant Examiner* — Emmanuel K Maglo
(74) *Attorney, Agent, or Firm* — Greenblum & Bernstein, P.L.C.

(57) ABSTRACT

Methods of sending a packet, NUMA nodes and non-transitory machine-readable storage mediums are provided in examples of the present disclosure. In one aspect, a first NUMA node queries a forwarding table based on a destination IP address of a packet to be forwarded to obtain a plurality of egress interfaces corresponding to the destination IP address; obtain, for each of the plurality of egress interfaces, node information of a second NUMA node to which the egress interface belongs, determining that the egress interface is on the first NUMA node when the node information of the second NUMA node is same as node information of the first NUMA node, wherein the second NUMA node is on the network device; and send the packet via an egress interface which belongs to the first NUMA node and is in the plurality of egress interfaces.

15 Claims, 2 Drawing Sheets

(56) References Cited

U.S. PATENT DOCUMENTS

| | | |
|---|---|---|
| 2011/0153935 A1 | 6/2011 | Li |
| 2011/0161943 A1 | 6/2011 | Bellows et al. |
| 2014/0237069 A1 | 8/2014 | Gray |
| 2014/0269421 A1* | 9/2014 | Previdi .................. H04L 45/46 370/254 |
| 2015/0067229 A1* | 3/2015 | Connor ............... G06F 13/4022 710/317 |
| 2016/0021000 A1* | 1/2016 | Previdi ................ H04L 45/507 370/392 |
| 2016/0092259 A1* | 3/2016 | Mehta ................ G06F 12/0815 718/1 |
| 2016/0285971 A1* | 9/2016 | Bilas ...................... H04L 69/14 |
| 2017/0163575 A1* | 6/2017 | Wang ................. H04L 49/9094 |
| 2017/0257275 A1* | 9/2017 | Atyam ................ H04L 41/0663 |
| 2017/0289036 A1* | 10/2017 | Vasudevan ............. H04L 49/70 |
| 2018/0307520 A1* | 10/2018 | Hyoudou ............. G06F 9/4856 |
| 2019/0158541 A1* | 5/2019 | Miriyala ............. H04L 63/0263 |

FOREIGN PATENT DOCUMENTS

| | | |
|---|---|---|
| CN | 102364900 A | 2/2012 |
| CN | 104901898 A | 9/2015 |
| JP | 3470951 B2 | 11/2003 |
| JP | 2005020492 A | 1/2005 |
| WO | 2012119369 A1 | 9/2012 |
| WO | 2015169057 A1 | 11/2015 |

OTHER PUBLICATIONS

State Intellectual Property Office of the People's Republic of China, Office Action and Search Report Issued in Application No. 2016110861504, dated Apr. 21, 2020, 16 pages, (Submitted with Machine Translation).
Japanese Patent Office, Office Action Issued in Application No. 2019-528820, dated Apr. 7, 2020, 5 pages. (Submitted with Machine Translation).
State Intellectual Property Office of the People's Republic of China Office Action and Search Report issued in Chinese Application No. 201611086150.4, dated Nov. 12, 2019, pp. 1-17, Beijing, China.
European Patent Office, Extended European Search Report Issued in Application No. 17875885.0, dated Jul. 17, 2019, Germany, 8 pages.
ISA State Intellectual Property Office of the People's Republic of China, Written Opinion of the International Searching Authority Issued in Application No. PCT/CN2017/113556, dated Feb. 7, 2018, WIPO, 4 pages.
European Patent Office issued Office Action for Application No. 17875885.0, dated Nov. 4, 2020.

* cited by examiner

SENDING PACKET

CROSS REFERENCE TO RELATED APPLICATIONS

The present application is a National Phase of International Application Number PCT/CN2017/113556, filed Nov. 29, 2017, and This application claims priority to Chinese Patent Application No. 201611086150.4 entitled "METHOD AND DEVICE FOR SENDING PACKET" filed on Nov. 30, 2016, the entire content of which is incorporated herein by reference.

BACKGROUND

In an SMP (Symmetric Multi-Processor) system, a plurality of processors on a computing device can share a memory subsystem and a bus structure, and workload can be uniformly distributed to all available processors.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Figure 1:
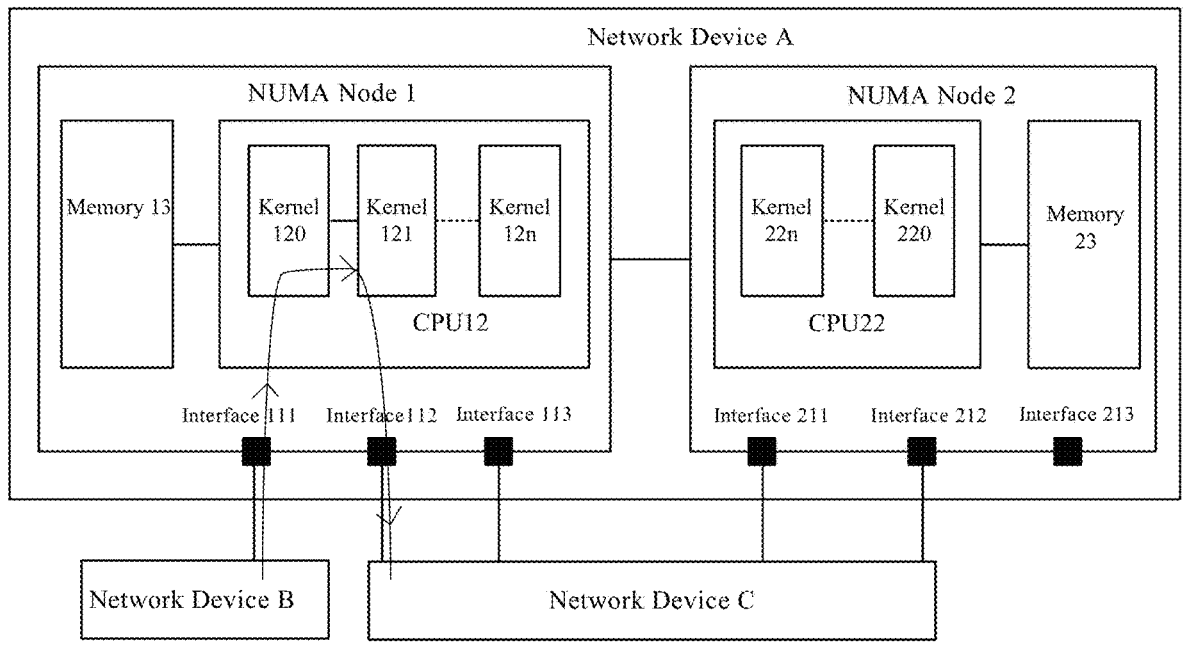
FIG. 1 is a schematic diagram illustrating a structure of a network including non-uniform memory architecture (NUMA) nodes based on an example of the present disclosure.

FIG. 1 is a schematic diagram illustrating a structure of a network including NUMA nodes based on an example of the present disclosure. In FIG. 1, a network device A includes a NUMA node 1 and a NUMA node 2. Each NUMA node includes a group of processor resources (e.g., a plurality of kernels in a Central Processing Unit (CPU) in the figure), a memory resource, and a plurality of interfaces, where the NUMA node 1 and the NUMA node 2 are connected via a Common System Interface (CSI) bus.

In an example, in a case that a packet is sent from the network device B to the network device C through the network device A, when the network device A receives the packet from a network device B through an interface 111, the NUMA node 1 may randomly select an interface from an interface 112, an interface 113, an interface 211 and an interface 212 to send the packet to a network device C to implement load sharing. It is assumed that the interface 212 is selected, the NUMA node 1 sends the packet to the NUMA node 2, and the NUMA node 2 forwards the packet to the network device C via the interface 212.

Apparently, in the example above, the NUMA node 1 forwards the packet to the NUMA node 2 via the CSI bus. Consequently, packet forwarding efficiency is reduced, and bandwidth overhead for the CSI bus is wasted.

Figure 2:
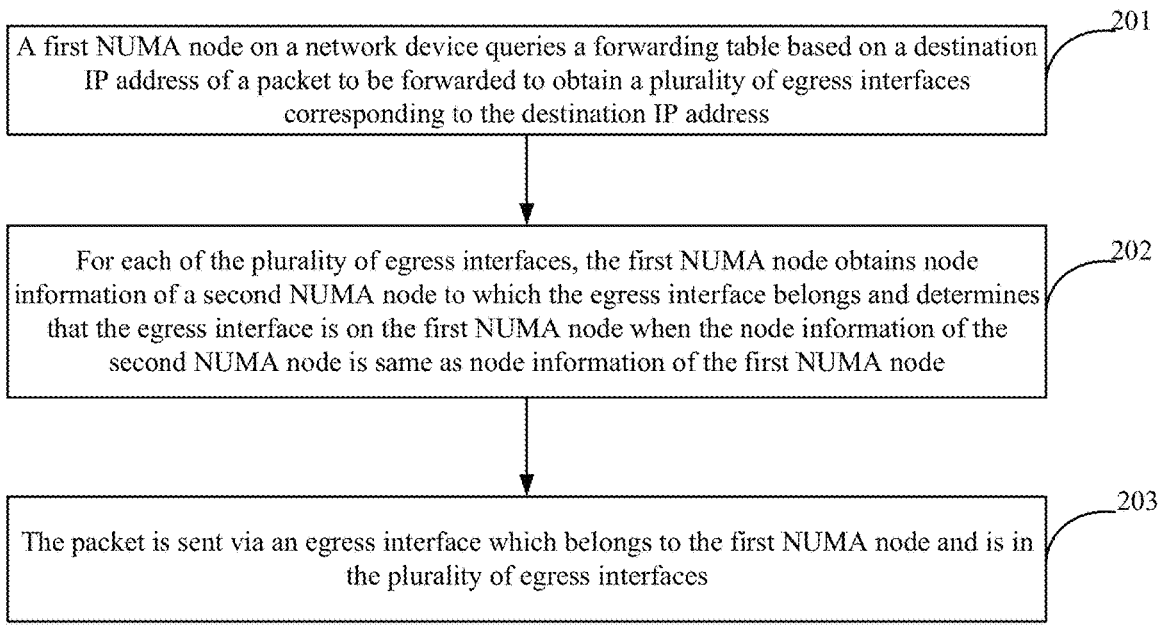
FIG. 2 is a flowchart illustrating a method of sending a packet based on an example of the present disclosure.

A method of sending a packet is provided based on an example of the present disclosure. The method may apply to a NUMA node on a network device (such as a router, a switch and the like). The network device may include a plurality of NUMA nodes, where each of the NUMA nodes includes a group of processor resources, a memory resource and a plurality of interfaces. The NUMA nodes are connected with each other via a CSI bus. FIG. 2 is a flowchart illustrating a method of sending a packet based on an example of the present disclosure. In FIG. 2, the method includes procedures as follows.

At block 201, a first NUMA node on a network device queries a forwarding table based on a destination IP address of a packet to be forwarded to obtain a plurality of egress interfaces corresponding to the destination IP address.

In an example, the first NUMA node may receive the packet via an ingress interface belonging to the first NUMA node. For example, a receiving kernel in a CPU on the first NUMA node receives the packet via the ingress interface. The receiving kernel may send the packet to a forwarding kernel in the CPU on the first NUMA node, and the forwarding kernel may forward the packet to another network device. In another example, the first NUMA node may generate the packet. For example, a control kernel in the CPU on the first NUMA node generates the packet and forwards the packet to another network device. For another example, the forwarding kernel may generate the packet and forward the packet to another network device.

At block 202, for each of the plurality of egress interfaces, the first NUMA node obtains node information of a second NUMA node to which the egress interface belongs and determines that the egress interface is on the first NUMA node when the node information of the second NUMA node is same as node information of the first NUMA node.

The second NUMA node may be on the network device.

In an example, before block 202, the first NUMA node may generate correspondences between the plurality of egress interfaces corresponding to the destination IP address and the node information of second NUMA nodes to which the plurality of egress interfaces respectively belong in a way that the first NUMA node can determine node information of a second NUMA node to which an egress interface belongs based on the generated correspondences. For example, a forwarding table may be maintained, and the forwarding table may record a correspondence between an IP address and egress interfaces. In a process of maintaining the forwarding table (e.g., when the first NUMA node generates the forwarding table corresponding to the destination IP address), when it is determined that the destination IP address corresponds to a plurality of egress interfaces, for each of the plurality of egress interfaces, the node information of the second NUMA node to which the egress interface belongs is acquired, and a correspondence among the destination IP address, each egress interface corresponding to the destination IP address and the node information of the second NUMA node to which the egress interface belongs is recorded in the forwarding table.

In an example, since the forwarding table records the correspondence among the destination IP address, each egress interface corresponding to the destination IP address and the node information of the second NUMA node to which the egress interface belongs, for each of the plurality of egress interfaces, the NUMA node can obtain the node information of the second NUMA node to which the egress interface belongs from the forwarding table.

In an example, a correspondence between an egress interface and node information of a second NUMA node to which the egress interface belongs may be stored in the forwarding table above, or may be stored in another list, which is not limited herein.

At block 203, the packet is sent via an egress interface which belongs to the first NUMA node and is in the plurality of egress interfaces.

In an example, in block 203, when one egress interface belongs to the first NUMA node, the packet may be sent via the one egress interface on the first NUMA node. When a plurality of egress interfaces belong to the first NUMA node, an egress interface is selected from the plurality of egress interfaces on the first NUMA node based on a preset load sharing strategy, and the packet is sent via the selected egress interface.

In an example, for each of the plurality of egress interfaces, the node information of the second NUMA node to which the egress interface belongs is determined based on the forwarding table (e.g., in block 202). For each egress interface corresponding to the destination IP address, when the node information of the second NUMA node to which the egress interface belongs is different from the node information of the first NUMA node, it may be determined that no egress interface belongs to the first NUMA node in the plurality of egress interfaces corresponding to the destination IP address. The first NUMA node may select an egress interface from the plurality of egress interfaces based on the preset load sharing strategy and send the packet via the selected egress interface.

Based on the technical solution above, in an example of the present disclosure, the first NUMA node queries a forwarding table based on a destination IP address of a packet to be forwarded to obtain a plurality of egress interfaces corresponding to the destination IP address, for each of the plurality of egress interfaces, obtains node information of a second NUMA node to which the egress interface belongs, determines that the egress interface is on the first NUMA node when the node information of the second NUMA node is same as node information of the first NUMA node, wherein the second NUMA node is on the network device; and sends the packet via an egress interface which belongs to the first NUMA node and is in the plurality of egress interfaces. In this way, the packet can be sent via the egress interface on the first NUMA node processing the packet rather than via an egress interface on another NUMA node in a way that cases of forwarding a packet cross NUMA nodes can be reduced, packet forwarding efficiency can be improved, bandwidth overhead for the CSI bus between NUMA nodes can be reduced, and overall throughput capability for the network device can be improved.

In an example, the technical solution in examples of the present disclosure is described below in detail in an application scenario in FIG. 1. In the application scenario, there are four links between a network device A and a network device C, where the four links form an Equal-Cost MultiPath (ECMP). When all the links are normal, load for a packet can be shared among all the links in a way that transmission performance can be improved. When a failure occurs for a link, the packet may be sent via a link for which no failure occurs to improve stability and reliability.

In an example, when the egress interfaces included in the ECMP are respectively on a plurality of NUMA nodes and an ingress interface via which a packet is received is different from an egress interface via which the packet are sent, the packet is forwarded cross NUMA nodes, thus, forwarding performance for the network device is affected and packet forwarding efficiency is reduced. In an example of the present disclosure, when the egress interfaces included in the ECMP are on a plurality of NUMA nodes, an egress interface via which a packet is received may be on a NUMA node processing the packet based on correspondences between egress interfaces and NUMA nodes as much as possible in a way that it can be avoided to forward the packet cross NUMA nodes, the forwarding performance for the network device can be improved, and the packet forwarding efficiency can be improved.

In an example, a host D (not shown in FIG. 1) connected with the network device B sends a packet to a host E (not shown in FIG. 1) connected with the network device C via the network A. it is assumed that an IP address of the host E is 100.100.100.100, the network device C may publish a route including the IP address 100.100.100.100 on four links, and the network device A may receive the route via the interface 112, the interface 113, the interface 211 and the interface 212, and may record a correspondence between the IP address 100.100.100.100 and the interfaces in the forwarding table (e.g., a route table). Table 1 is an example of the forwarding table.

TABLE 1

| IP Address | Egress Interface |
| --- | --- |
| 100.100.100.100 | Interface 112 |
| | Interface 113 |
| | Interface 211 |
| | Interface 212 |

In an example of the present disclosure, when the network device A generates the forwarding table corresponding to the IP address 100.100.100.100, the network device A may record a correspondence among the IP address 100.100.100.100, four egress interfaces and the node information of the NUMA nodes to which the four egress interfaces respectively belong in the forwarding table in table 2 which is different from table 1 above.

TABLE 2

| IP Address | Egress Interface |
| --- | --- |
| 100.100.100.100 | Interface 112, node information of NUMA node 1 |
| | Interface 113, node information of NUMA node 1 |
| | Interface 211, node information of NUMA node 2 |
| | Interface 212, node information of NUMA node 2 |

In an example, a control kernel is determined from all kernels on the network device A. For example, a kernel 120 on the NUMA node 1 is determined to be the control kernel, routes received via the interface 112, the interface 113, the interface 211 and the interface 212 may be sent to the control kernel 120. The control kernel 120 may generate the forwarding table in table 2 when receiving the routes and store the forwarding table in a memory 13. In a subsequent process, the kernels on all NUMA nodes may access the forwarding table in the memory 13.

In an example, to generate the forwarding table in table 2, a correspondence between each of the interfaces and the node information of the NUMA node to which the interface belongs is pre-configured on the network device A, e.g., a correspondence between the interface 111 and the node information of the NUMA node 1, a correspondence between the interface 112 and the node information of the NUMA node 1, a correspondence between the interface 113 and the node information of the NUMA node 1, a correspondence between the interface 211 and the node information of the NUMA node 2, a correspondence between the interface 212 and the node information of the NUMA node 2 and a correspondence between the interface 213 and the node information of the NUMA node 2. On this basis, when generating the forwarding table 1, the control kernel may obtain the node information of the NUMA node 1 to which the interface 112 belongs, the node information of the NUMA node 1 to which the interface 113 belongs, the node information of the NUMA node 2 to which the interface 211 belongs and the node information of the NUMA node 3 to which the interface 212 belongs by querying the correspondences to generate the table 2.

In the application scenario above, the method of sending a packet based on an example of the present disclosure includes procedures as follows.

In step 1, the NUMA node 1 obtains a packet, where the destination IP address of the packet is 100.100.100.100.

In step 2, the NUMA node 1 queries the forwarding table illustrated in table 2 based on the destination IP address 100.100.100.100 to obtain the egress interfaces matched with the destination IP address 100.100.100.100, which includes the interface 112, the interface 113, the interface 211 and the interface 212.

In step 3, for each egress interface, the NUMA node 1 obtains the node information of the NUMA node to which the egress interface belongs from the forwarding table illustrated in table 2. For example, the NUMA node 1 obtains the node information of the NUMA node 1 to which the interface 112 belongs, the node information of the NUMA node 1 to which the interface 113 belongs, the node information of the NUMA node 2 to which the interface 211 belongs, and the node information of the NUMA node 2 to which the interface 212 belongs.

In step 4, based on the node information of the NUMA node to which each egress interface belongs, the NUMA node 1 determines that the interface 112 and the interface 113 are egress interfaces on the NUMA node 1 in the interfaces corresponding to the destination IP address 100.100.100.100.

In a first way, when the NUMA node 1 receives the packet, the NUMA node 1 determines that an ingress interface via which the packet is received is the interface 111. The NUMA node 1 may determine the node information of the NUMA node 1 to which the interface 111 belongs based on the correspondence between each interface and the node information of the NUMA node to which the interface belongs which is pre-configured on the network device A. On this basis, it can be determined that the node information of the NUNA node to which the interface 112 belongs and the node information of the NUMA node to which the interface 113 belongs are same as the node information of the NUMA node 1 to which the interface 111 belongs, the NUMA node 1 may determine that the interface 112 and the interface 113 are the egress interfaces on the NUMA node 1. Since the node information of the NUMA node 2 to which the interface 211 belongs and the node information of the NUMA node 2 to which the interface 212 belongs are respectively different from the node information of the NUMA node 1 to which the interface 111 belongs, the NUMA node 1 may determine that neither the interface 211 nor the interface 212 is on the NUMA node 1.

In a second way, when the NUMA node 1 receives or generates the packet, the NUMA node 1 may determine the node information itself. Since the node information of the NUMA node to which the interface 112 belongs and node information of the NUMA node to which the interface 113 belongs are same as the node information of the NUMA node 1, the NUMA node 1 may determine that the interface 112 and the interface 113 are the egress interfaces on the NUMA node 1. Since the node information of the NUMA node 2 to which the interface 211 and the interface 212 belong is different from the node information of the NUMA node 1, the NUMA node 1 may determine that the interface 211 and the interface 212 are not the egress interfaces on the NUMA node 1.

In an example, each NUMA node includes a receiving kernel (used to receive a packet from another network device) and a forwarding kernel (used to send a packet to another network device). For example, in a CPU 12 in FIG. 1, a kernel 120 is the control kernel, a kernel 121 is the receiving kernel, and kernels 122-12$n$ are forwarding kernels; in a CPU 22 in FIG. 1, a kernel 220 is the receiving kernel, and the kernels 222-22$n$ are the forwarding kernels.

In an example, the receiving kernel in the CPU12 may receive a packet, and deliver the packet to the forwarding kernel in the NUMA node 1 including the receiving kernel. The forwarding kernel receives the packet, and the process that the NUMA node 1 determines an egress interface corresponding to the packet on the NUMA node 1 may adopt the first manner or second manner above. The receiving kernel in the CPU22 may receive a packet, and only deliver the packet to the forwarding kernel in the NUMA node 2 including the receiving kernel. The forwarding kernel receives the packet, and the process that the NUMA node 2 determines an egress interface corresponding to the packet on the NUMA node 2 may adopt the first manner or second manner above.

In step 5, the NUMA node 1 sends a packet via an egress interface corresponding to the IP address 100.100.100.100 on the NUMA node 1.

In an example, when one egress interface corresponding to the IP address 100.100.100.100 belongs to the NUMA node 1, the NUMA node 1 may send the packet via the one egress interface corresponding to the IP address 100.100.100.100 on the NUMA node 1. When a plurality of egress interfaces corresponding to the IP address 100.100.100.100 belong to the NUMA node 1, the NUMA node may select an egress interface from the plurality of egress interfaces corresponding to the IP address 100.100.100.100 on the NUMA node 1 based on a preset load sharing strategy (e.g., a polling strategy or a hash strategy and so on) and send the packet via the selected egress interface.

For example, since the interface 112 and the interface 113 are the egress interfaces on the NUMA node 1, the NUMA node 1 may select an egress interface from the interface 112 and the interface 113 based on the preset load sharing strategy (e.g., the polling strategy or the hash strategy) and send the packet via the selected egress interface.

In an example, when the preset load sharing strategy is the polling strategy, the egress interface selecting process may include procedures as follows. When a first packet is sent from the host D connected with the network device B to the host E connected with the network device A, the NUMA node 1 may select the interface 112 first. Since the interface 112 is the egress interface on the NUMA node 1, the NUMA node 1 may send the first packet via the interface 112; when a second packet is sent from the host D to the host E, the NUMA node 1 may select the interface 113. Since the interface 113 is the egress interface on the NUMA node 1, the NUMA node 1 may send the second packet via the interface 113; when a third packet is sent from the host D to the host E, the NUMA node 1 may select the interface 211. Since the interface 211 is not the egress interface on the NUMA node 1, the NUMA node 1 may select the next interface 212; further, the interface 212 is not the egress interface on the NUMA node 1, thus, the NUMA node 1 may select the next interface 112. Since the interface 112 is the egress interface on the NUMA node 1, the NUMA node 1 may send the third packet via the interface 112, and so on.

In an example, when the preset load sharing strategy is the hash strategy, the egress interface selecting process may include procedures as follows. When a first packet is sent from the host D connected with the network device B connected with the host E in the network device A, a hash value may be randomly generated based on a source IP address and a destination IP address of the packet, where a generation method is not redundantly described in detail. The hash value is divided by a number 2 (i.e., the number of the egress interfaces corresponding to the IP address 100.100.100.100 on the NUMA node) to obtain a reminder. If the remainder is equal to 0, the NUMA node 1 may send the first packet via the interface 112. If the remainder is equal to 1, the NUMA node 1 may send the first packet via the interface 113, and so on. Each packet sent from the host D to the host E may be processed in the manner above.

In the process above, an example that an egress interface corresponding to the IP address 100.100.100.100 belongs to the NUMA node 1 is described. In another example, when no egress interfaces corresponding to the destination IP address belongs to the NUMA node 1, the NUMA node 1 may select an egress interface from all the egress interfaces (e.g., egress interfaces corresponding to the destination IP address on other NUMA nodes) corresponding to the destination IP address based on the preset load sharing strategy (e.g., the polling strategy or the hash strategy) and send the packet via the selected egress interface, which is not redundantly described in detail.

In an example, the above method of sending a packet may be executed by the control kernel or the forwarding kernel on which the packet is received on the NUMA node 1.

Based on the technical solutions above, in an example of the present disclosure, the NUMA node 1 queries a forwarding table based on a destination IP address of a packet to be forwarded to obtain a plurality of egress interfaces corresponding to the destination IP address, for each of the plurality of egress interfaces, obtains node information of a NUMA node to which the egress interface belongs, determines that the egress interface is on the NUMA node 1 when the node information of the NUMA node is same as node information of the NUMA node 1, wherein the NUMA node is on the network device; and sends the packet via an egress interface which belongs to the NUMA node 1 and is in the plurality of egress interfaces. In this way, the packet can be sent via the egress interface on the NUMA node 1 processing the packet rather than via an egress interface on another NUMA node in a way that cases of forwarding a packet cross NUMA nodes can be reduced, packet forwarding efficiency can be improved, bandwidth overhead for the CSI bus between NUMA nodes can be reduced, and overall throughput capability for the network device can be improved.

Methods according to the present disclosure are described above. Devices according to the present disclosure are described below.

Figure 3:
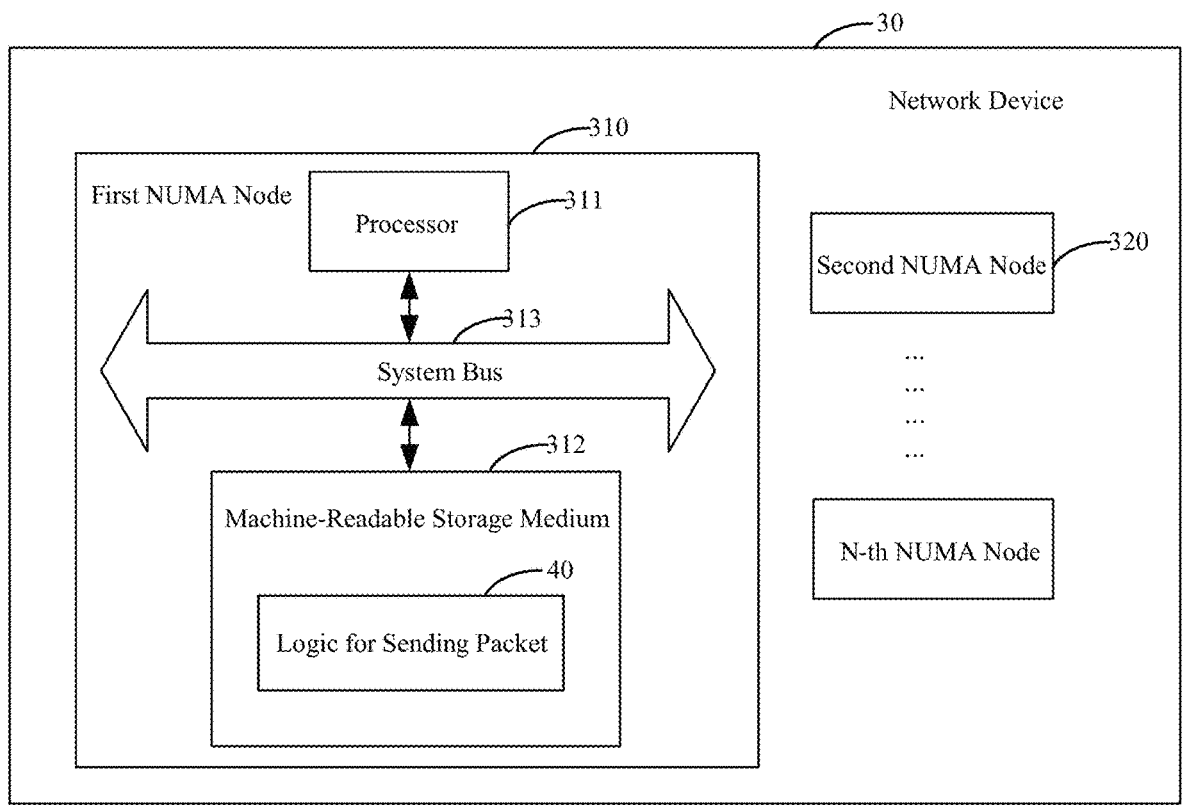
FIG. 3 is a schematic diagram illustrating a hardware structure of a network device based on an example of the present disclosure.

FIG. 3 schematically illustrates a hardware structure diagram of a network device, which is provided by an example of the present disclosure. The network device 300 may include a plurality of Non-Uniform Memory Architecture (NUMA) nodes. A first NUMA node 310 in the plurality of NUMA nodes includes a processor 311 and a machine-readable storage medium 312 storing machine executable instructions. The processor 311 may communicate with the machine-readable storage medium 312 via a system bus 313, and execute the method of sending a packet described above by reading and executing the machine executable instructions corresponding to a packet sending logic 40 in the machine-readable storage medium 312. In an example, the processor 311 may include a plurality of kernels, and a kernel in the plurality of kernels reads and executes the machine executable instructions corresponding to a packet sending logic 40 in the machine-readable storage medium 312. For example, a control kernel in the first NUMA node generates the packet, and reads and executes the machine executable instructions corresponding to the packet sending logic 40 in the machine-readable storage medium 312. For another example, a receiving kernel receives the packet, and sends the packet to a forwarding kernel in the first NUMA node. The forwarding kernel reads and executes the machine executable instructions corresponding to the packet sending logic 40 in the machine-readable storage medium 312.

As used herein, the machine-readable storage medium 312 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 4:
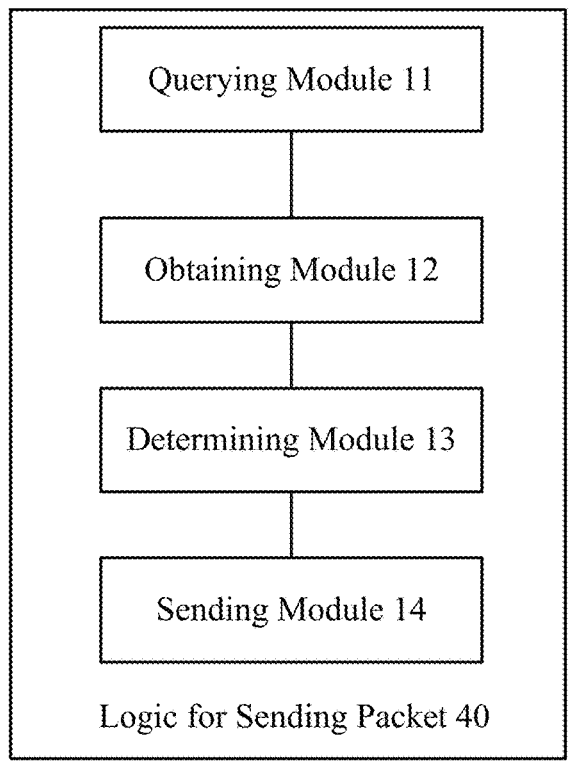
FIG. 4 is a schematic diagram illustrating a structure of a logic for sending a packet based on an example of the present disclosure.

As shown in FIG. 4, functionally divided, the logic 40 for sending a packet above may include modules as follows.

A querying module 11 is configured to query a forwarding table based on a destination IP address of a packet to be forwarded to obtain a plurality of egress interfaces corresponding to the destination IP address.

An obtaining module 12 is configured to obtain, for each of the plurality of egress interfaces, node information of a second NUMA node 320 to which the egress interface belongs, wherein the second NUMA node 320 is on the network device.

A determining module 13 is configured to determine that the egress interface is on the first NUMA node when the node information of the second NUMA node 320 is same as node information of the first NUMA node, wherein the second NUMA node 320 is on the network device.

A sending module 14 is configured to send the packet via an egress interface which belongs to the first NUMA node and is in the plurality of egress interfaces.

In an example, the logic 40 further includes (not shown in the figure): a recording module. The recording module is configured to determine, for each of the plurality of egress interfaces, the node information of the second NUMA node 320 to which the egress interface belongs; and record a correspondence between the egress interface and the node information of the second NUMA node 320 to which the egress interface belongs in an item including the egress interface in the forwarding table.

In an example, the obtaining module 12 is configured to obtain the node information of the second NUMA node 320 to which the egress interfaces belong based on the correspondence recorded in the forwarding table.

In an example, the sending module 14 is configured to when one egress interface corresponding to the destination IP address belongs to the first NUMA node, send the packet via the one egress interface on the first NUMA node; and when a plurality of egress interfaces corresponding to the destination IP address belong to the first NUMA node, select an egress interface from the plurality of egress interfaces corresponding to the destination IP address on the first NUMA node based on a preset load sharing strategy, and sending the packet via the selected egress interface.

In an example, the sending module 14 is configured to when no egress interface corresponding to the destination IP address belongs to the first NUMA node, select an egress interface from the plurality of egress interfaces corresponding to the destination IP address based on a preset load sharing strategy and sending the packet via the selected egress interface.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of sending a packet, comprising:
    querying, by a first Non-Uniform Memory Architecture (NUMA) node on a network device, a forwarding table based on a destination IP address of a packet to be forwarded to obtain a plurality of egress interfaces corresponding to the destination IP address;
    for each of the plurality of egress interfaces,
        obtaining, by the first NUMA node, node information of a second NUMA node to which the egress interface belongs,
        determining, by the first NUMA node, that the egress interface is on the first NUMA node when determining that the node information of the second NUMA node is same as node information of the first NUMA node, wherein the second NUMA node is on the network device; and
    sending, by the first NUMA node, the packet via an egress interface which belongs to the first NUMA node and is in the plurality of egress interfaces.

2. The method according to claim 1, further comprising:
    determining, for each of the plurality of egress interfaces, by the first NUMA node, the node information of the second NUMA node to which the egress interface belongs; and
    recording, by the first NUMA node, a correspondence between the egress interface and the node information of the second NUMA node to which the egress interface belongs in an item comprising the egress interface in the forwarding table.

3. The method according to claim 2, wherein the first NUMA node obtaining the node information of the second NUMA node to which the egress interface belongs comprises:
    obtaining, for each of the plurality of egress interfaces, by the first NUMA node, the node information of the second NUMA node to which the egress interface belongs based on the correspondence recorded in the forwarding table.

4. The method according to claim 1, wherein the first NUMA node sending the packet via the egress interface on the first NUMA node comprises:
    when one egress interface corresponding to the destination IP address belongs to the first NUMA node, sending, by the first NUMA node, the packet via the one egress interface on the first NUMA node; and
    when a plurality of egress interfaces corresponding to the destination IP address belong to the first NUMA node, selecting, by the first NUMA node, an egress interface from the plurality of egress interfaces corresponding to the destination IP address on the first NUMA node based on a preset load sharing strategy, and sending the packet via the selected egress interface.

5. The method according to claim 1, further comprising:
    when no egress interface corresponding to the destination IP address belongs to the first NUMA node, selecting, by the first NUMA node, an egress interface from the plurality of egress interfaces corresponding to the destination IP address based on a preset load sharing strategy and sending the packet via the selected egress interface.

6. The method according to claim 5, wherein sending the packet via the selected egress interface comprises:
    forwarding, by the first NUMA node, the packet to the second NUMA node to which the selected egress interface belongs via a Common System Interface (CSI) interface between the first NUMA node and the second NUMA node to which the selected egress interface belongs in a way that the second NUMA node sends the packet via the selected egress interface.

7. A network device, comprising:
    a plurality of Non-Uniform Memory Architecture (NUMA) nodes,
    wherein a first NUMA node in the plurality of NUMA nodes comprises:

a processor, and
a non-transitory machine-readable storage medium storing machine executable instructions which are executable by the processor to:
query a forwarding table based on a destination IP address of a packet to be forwarded to obtain a plurality of egress interfaces corresponding to the destination IP address;
for each of the plurality of egress interfaces, obtain node information of a second NUMA node to which the egress interface belongs, determine that the egress interface is on the first NUMA node when determining that the node information of the second NUMA node is same as node information of the first NUMA node, wherein the second NUMA node is on the network device; and
send the packet via an egress interface which belongs to the first NUMA node and is in the plurality of egress interfaces.

8. The NUMA node according to claim 7, wherein the processor is caused by the machine-executable instructions further to:
determine, for each of the plurality of egress interfaces, the node information of the second NUMA node to which the egress interface belongs; and
record a correspondence between the egress interface and the node information of the second NUMA node to which the egress interface belongs in an item comprising the egress interface in the forwarding table.

9. The NUMA node according to claim 8, wherein the processor is caused by the machine-executable instructions to:
obtain, for each of the plurality of egress interfaces, the node information of the second NUMA node to which the egress interface belongs based on the correspondence recorded in the forwarding table.

10. The NUMA node according to claim 7, wherein the processor is caused by the machine-executable instructions to:
when one egress interface corresponding to the destination IP address belongs to the first NUMA node, send the packet via the one egress interface on the first NUMA node; and
when a plurality of egress interfaces corresponding to the destination IP address belong to the first NUMA node, select an egress interface from the plurality of egress interfaces corresponding to the destination IP address on the first NUMA node based on a preset load sharing strategy, and sending the packet via the selected egress interface.

11. The NUMA node according to claim 7, wherein the processor is caused by the machine-executable instructions further to:
when no egress interface corresponding to the destination IP address belongs to the first NUMA node, select an egress interface from the plurality of egress interfaces corresponding to the destination IP address based on a preset load sharing strategy and sending the packet via the selected egress interface.

12. A non-transitory machine-readable storage medium storing machine executable instructions which are invoked and executed by a processor of a network device to:
query a forwarding table based on a destination IP address of a packet to be forwarded to obtain a plurality of egress interfaces corresponding to the destination IP address;
for each of the plurality of egress interfaces,
obtain node information of a second NUMA node to which the egress interface belongs,
determine that the egress interface is on the first NUMA node when determining that the node information of the second NUMA node is same as node information of the first NUMA node, wherein the second NUMA node is on the network device; and
send the packet via an egress interface which belongs to the first NUMA node and is in the plurality of egress interfaces.

13. The machine-readable storage medium according to claim 12, wherein the machine-executable instructions cause the processor further to:
determine, for each of the plurality of egress interfaces, the node information of the second NUMA node to which the egress interface belongs; and
record a correspondence between the egress interface and the node information of the second NUMA node to which the egress interface belongs in an item comprising the egress interface in the forwarding table.

14. The machine-readable storage medium according to claim 13, wherein the machine-executable instructions cause the processor to:
obtain, for each of the plurality of egress interfaces, the node information of the second NUMA node to which the egress interface belongs based on the correspondence recorded in the forwarding table.

15. The machine-readable storage medium according to claim 12, wherein the machine-executable instructions cause the processor to:
when one egress interface corresponding to the destination IP address belongs to the first NUMA node, send the packet via the one egress interface on the first NUMA node; and when a plurality of egress interfaces corresponding to the destination IP address belong to the first NUMA node, select an egress interface from the plurality of egress interfaces corresponding to the destination IP address on the first NUMA node based on a preset load sharing strategy, and sending the packet via the selected egress interface.

* * * * *